(12) United States Patent
Merzhauser

(10) Patent No.: US 6,398,927 B1
(45) Date of Patent: Jun. 4, 2002

(54) WATER PURIFYING MEANS

(75) Inventor: Hans Merzhauser, Mijas/Costa (ES)

(73) Assignee: Entrente Holding SA, Luxembourg (LU)

( * ) Notice: Subject to any disclaimer, the term of this patent is extended or adjusted under 35 U.S.C. 154(b) by 0 days.

(21) Appl. No.: 09/600,507

(22) PCT Filed: Feb. 1, 1999

(86) PCT No.: PCT/NO99/00029

§ 371 (c)(1),
(2), (4) Date: Sep. 11, 2000

(87) PCT Pub. No.: WO99/38807

PCT Pub. Date: Aug. 5, 1999

(30) Foreign Application Priority Data

Jan. 30, 1998 (NO) .............................................. 19980415

(51) Int. Cl.[7] .................................................. C02F 1/461
(52) U.S. Cl. .................................... 204/242; 204/275.1
(58) Field of Search .................................. 205/701, 742; 204/242, 275.1

(56) References Cited

U.S. PATENT DOCUMENTS 4,048,032 A * 9/1977 Eibl ............................ 205/701
5,759,383 A * 6/1998 Byles .......................... 205/701

* cited by examiner

*Primary Examiner*—Arun S. Phasge
(74) *Attorney, Agent, or Firm*—Pitney, Hardin, Kipp & Szuch LLP

(57) ABSTRACT

Device for purifying water with electric voltage from a power source on at least one cathode (2) and at least two anodes (3, 4), where the device having the shape substantially as a short pipe (1) for installation in a piping system, the cathode and the anodes being secured in a triangle shape inside the pipe (1), the cathode (2) being of bronze and the anodes (3, 4) being of silver, the current thereby being alternating between the two anodes and the cathode as the current pulses up to 18 V and the frequencies up to 2,000 Hz.

1 Claim, 1 Drawing Sheet

WATER PURIFYING MEANS

BACKGROUND OF THE INVENTION

1. Field of the Invention

The present invention is related to a method and a device for water purification.

2. Description of the Prior Art

Increasingly methods have been developed for purifying water in different connections, from purifying drinking water down to acceptable levels and further for purifying water used in swimming pools, whereby between these extreme points also is found purifying plants for water used industrially.

Mostly water purifying plants use filter devices where the filter from time to time must be replaced and where there is a possibility that the plant as such is destroyed in case the filter is not cleaned in time.

SUMMARY OF THE INVENTION

With the method and the device according to the present invention the only maintenance work to be done is to replace the anodes respectively the cathodes in the device at suitable intervals, such as one or twice year.

This is achieved with the method and the device according to the present invention as defined with the features stated in the claims.

BRIEF DESCRIPTION OF THE DRAWINGS

The drawing discloses in FIG. 1 as a block diagram the principle units in the device according to the invention and FIG. 2 discloses in a cross section chematically an arrangement of anodes and cathodes in a pipe.

DETAILED DESCRIPTION OF THE PREFERRED EMBODIMENT

Figure 1:
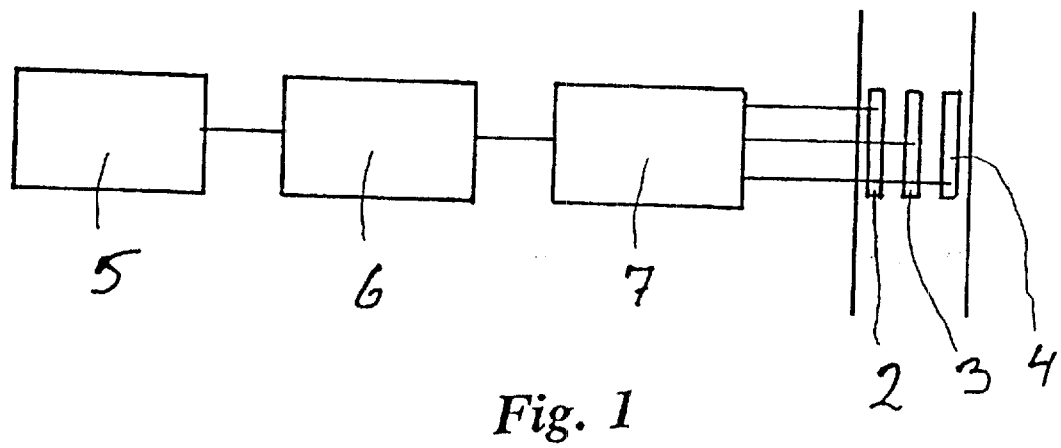
Figure 2:
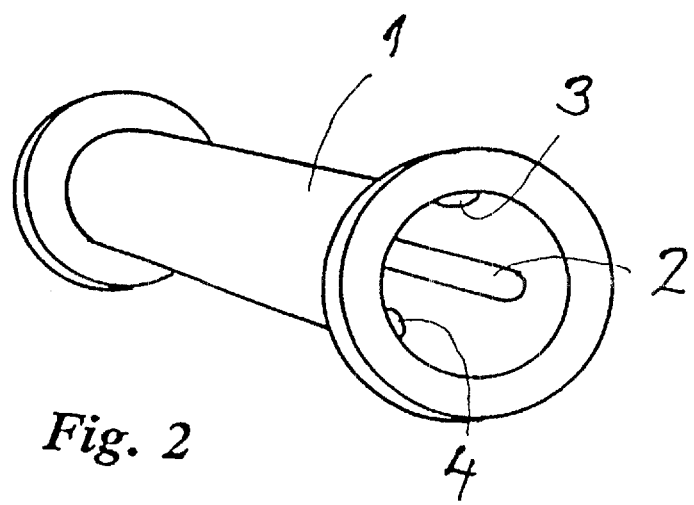

The device according to the invention comprises a pipe 1 as disclosed in FIG. 2, which may be inserted into a supply pipe for water to a domestic house or a flat or other water consuming units. The pipe also may be inserted into the circuit of a water circulation in a unit with a closed circuit, such as a swimming pool. Water there is transported by pumps through the piping system and the filter devices as well as the pipe 1 according to the present invention, whereby the water thereafter is returned to the swimming pool after the treatment. The pump as well as the purification unit may be connected to a timer thereby to ensure that the active time for the purification unit only covers the need.

The purification unit according to the present invention, comprises a transformer 5 which may be connected to the normal 220 V A.C. for transforming the voltage down to for example 12 V. Thereafter the alternating current is rectified and thereafter transformed into rectangular pulses by an oscillator 6 whereafter the pulses are amplified in an amplifier 7 and connected with a cathode 2 as well as two anodes 3 and 4. The current thereby is alternating between the one and the other anode in such a way that the current constantly continuous through the cathode, however alternating between the two anodes.

The frequency from the oscillator may be chosen in relation to the specific parameters for specific conditions depending on the water analyzes, claim to the water after treatment etc. Frequencies from 2 Hz up to 2 kHz and a current from 12 to 18 V have shown good results in providing good rectified water.

The cathode 2 and the two anodes 3 and 4 are arranged in a triangle position in the pipe such as disclosed in FIG. 2 whereby the electric current will alternate in the gap between the cathode 2 and the two anodes 3 and 4, thereby ensuring good treatment of the water. In cases where the unit is used for purifying water in a swimming pool, more anodes may be used.

The cathode 2 in the purifying device for drinking water may preferably be manufactured by bronze, whereas the anodes 3 and 4 may be manufactured by silver. For use in the circuit of a swimming pool, the cathode 2 may be produced by copper whereas the anodes 3 and 4 may be a copper silver alloy. For the use in a swimming pool for example two sets of anodes may be preferred. Other methods may be chosen depending on the conditions. Substantial in this connection is that the electrolytic effect is achieved in such a way that silver sulphate is produced, which is disinfective.

What is claimed is:

1. Device for purifying water with electric voltage including:
   a power source including at least one cathode and at least two anodes;
   wherein the device has a shape substantially of a short pipe for installation in a piping system, said cathode and said anodes being secured in a triangular shape inside said short pipe, said cathode being of bronze and said anodes being of silver, electric current thereby alternating between said anodes and said cathode as the current pulses up to 18 volts and frequencies up to 2,000 Hz.

* * * * *